United States Patent
Stach

[11] Patent Number: 6,132,008
[45] Date of Patent: Oct. 17, 2000

[54] WHEEL FOR A MOTOR VEHICLE AND METHOD OF MAKING SAME

[75] Inventor: Jens Stach, Eberdingen, Germany

[73] Assignee: Dr. Ing. h.c.F. Porsche AG, Weissach, Germany

[21] Appl. No.: 09/058,860

[22] Filed: Apr. 13, 1998

[30] Foreign Application Priority Data

Apr. 11, 1997 [DE] Germany ............................ 197 15 072

[51] Int. Cl.[7] ...................................................... B60B 3/08
[52] U.S. Cl. ..................................... 301/64.1; 29/894.323; 29/894.34
[58] Field of Search .................................. 301/63.1, 64.1, 301/64.2, 64.3, 65; 29/894.34, 894.344, 894.322, 894.323, 413, 414

[56] References Cited

U.S. PATENT DOCUMENTS

| | | | |
|---|---|---|---|
| 496,633 | 5/1893 | Bettendorf | 301/64.2 |
| 735,812 | 8/1903 | Phipps | 301/64.2 |
| 1,711,833 | 5/1929 | Crissman | 29/894.344 |
| 2,041,657 | 5/1936 | Hight | 29/894.344 |
| 2,170,617 | 8/1939 | Hamill | 301/64.1 X |
| 3,270,403 | 9/1966 | Bullens | 29/894.344 |
| 5,345,676 | 9/1994 | Ashley, Jr. | 301/63.1 X |
| 5,577,810 | 11/1996 | Abe et al. | 301/63.1 |

FOREIGN PATENT DOCUMENTS

| | | | |
|---|---|---|---|
| 205867 | 12/1986 | European Pat. Off. | 29/894.322 |
| 9302974 U | 10/1993 | Germany . | |
| 19601778 | 1/1996 | Germany . | |
| 197 15 072 | 12/1997 | Germany . | |

*Primary Examiner*—Russell D. Stormer
*Attorney, Agent, or Firm*—Evenson, McKeown, Edward & Lenahan, P.L.L.C.

[57] ABSTRACT

A wheel for a motor vehicle comprises two shell parts, with one shell part forming a wheel spider and the other shell part forming a rim. The shell parts are fitted into one another and connected together. Air openings in the rim are provided with a cast web that is punched out precisely so that the air openings in the wheel spider are located in correspondence with the air openings in the rim and can be connected to them.

8 Claims, 3 Drawing Sheets

WHEEL FOR A MOTOR VEHICLE AND METHOD OF MAKING SAME

BACKGROUND AND SUMMARY OF THE INVENTION

This application claims the priority of application 197 15 072.1, filed in Germany on Apr. 11, 1997, the disclosure of which is expressly incorporated by reference herein.

The invention relates to a wheel for a motor vehicle with a wheel spider and a rim, each formed by a shell part, and having hollow spokes between them as well as walls with air openings, said spider and rim being capable of being connected permanently with one another.

German application number 196 01 778.5, describes a wheel that consists of two shell parts, for example a wheel spider and a rim well. These two shell parts are partially inserted into one another and connected together in areas in which they are in contact, for example by welds. In particular, there is a circumferential connection in the vicinity of the air openings in the two shell parts.

A goal of the invention is to provide a wheel for a motor vehicle that consists of two shell parts, said parts being designed precisely for connection in simple fashion, and in particular can be fitted into one another in the vicinity of the air openings.

This goal is achieved according to the invention by providing a wheel of the above-noted type, wherein the air openings of a rim are covered by a cast web that can be punched.

Primary advantages achieved by the invention consist essentially in that a dimensionally exact air opening is formed in the shell part of the rim by providing a cast web in the air openings of the rim, said openings being produced in the course of the casting of the rim, and a subsequent mechanical punching of this web. The air openings have a metallically clean edge suitable for welding to the other shell part. In addition, the tolerances for the size of the air opening are limited and a precise fit is achieved for the wall of the other air opening in the shell part of the wheel spider. As a result, problem-free welding can be performed, using an electron-beam welding process or other welding processes for example.

The cast web preferably has a smaller thickness than the wall of the shell part of the rim in this area and lies flush with at least one surface of the rim. In addition, only one edge bordering the air opening is possible, which is then punched out to form the dimensionally precise air opening. Preferably the cast web is designed to lie flush with the inner surface of the shell part of the rim, with the web being made thinner than the wall of the shell and producing a depression in the outer surface.

The web is preferably punched out using a tool that has a plurality of punches whose number corresponds to that of the air openings, said punches acting against pressure pads. The adjoining walls of the shell part of the rim at the pressure pad are designed to abut the pressure pad somewhat and are each spaced away from the edge of the air opening. In addition, a milling method or laser cutting method can also be used to cut out the web.

Other objects, advantages and novel features of the present invention will become apparent from the following detailed description of the invention when considered in conjunction with the accompanying drawings.

DETAILED DESCRIPTION OF THE DRAWINGS

Figure 1:
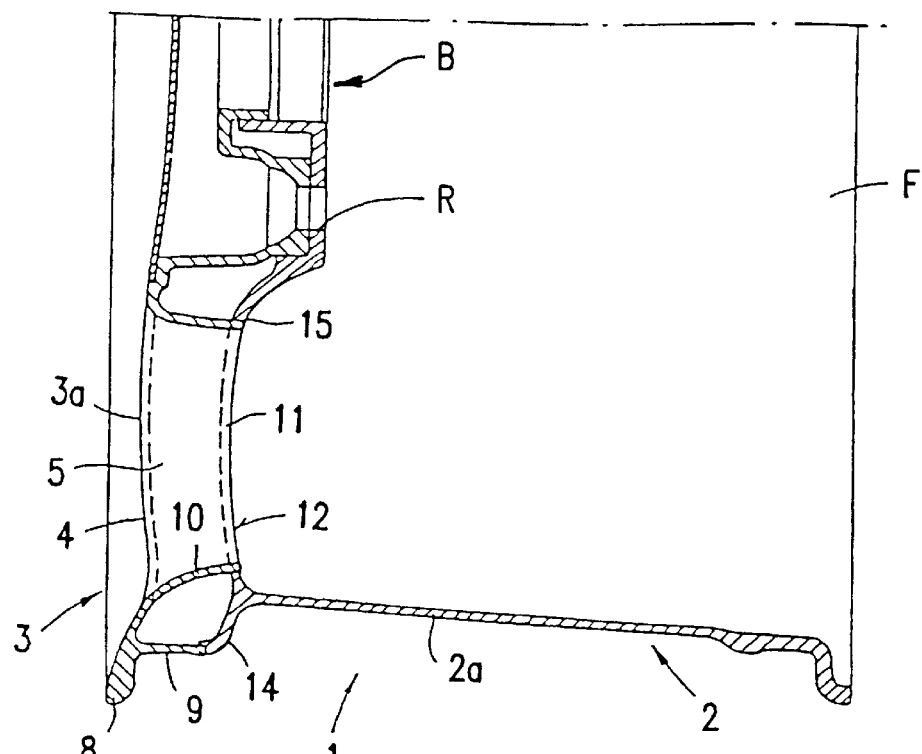
FIG. 1 is a sectional view through a wheel composed of two shell parts, with one shell part forming the rim and the other shell part forming the wheel spider, constructed according to preferred embodiments of the invention.

As shown in greater detail in FIG. 1, wheel 1 includes two shell parts 2, 3, constituting rim F with rim well 2a and wheel spider 3a. These shell parts 2, 3 are produced separately, assembled to form a wheel, and permanently connected to one another by a bond, for example by welding or gluing.

Wheel spider 3a forms the outer part of wheel 1 and comprises an outside wall 4 in which air openings 5 and cylindrical receptacles R for wheel mounting bolts are provided that are located around a hub bushing B. The outer edge of wheel spider 3a is formed by a rim flange 8 adjoined by an annular rib 9 that extends into the interior of the rim, said rib being part of a hump area.

The air openings 5 in wheel spider 3a have boundary walls 10 bent inward to form air channels, said walls projecting into adjacent air openings 11 of rim F. These boundary walls 10 form hollow spokes between air openings 5 and 11.

Shell part 2 of rim F comprises an inside wall 12 with a rim well 2a that is depressed. This well is adjoined by an endwise annular rib 14 with a raised shape, said rib being located opposite annular rib 9 of wheel spider 3a for connection. Air openings 5 are provided in inside wall 12, said openings having opening edges 15.

Boundary walls 10 of air openings 5 of wheel spider 3a are designed so that they point into the interior of the wheel and are preferably located inside the edges 15 of air openings 11 in shell part 2 of rim F.

Figure 2:
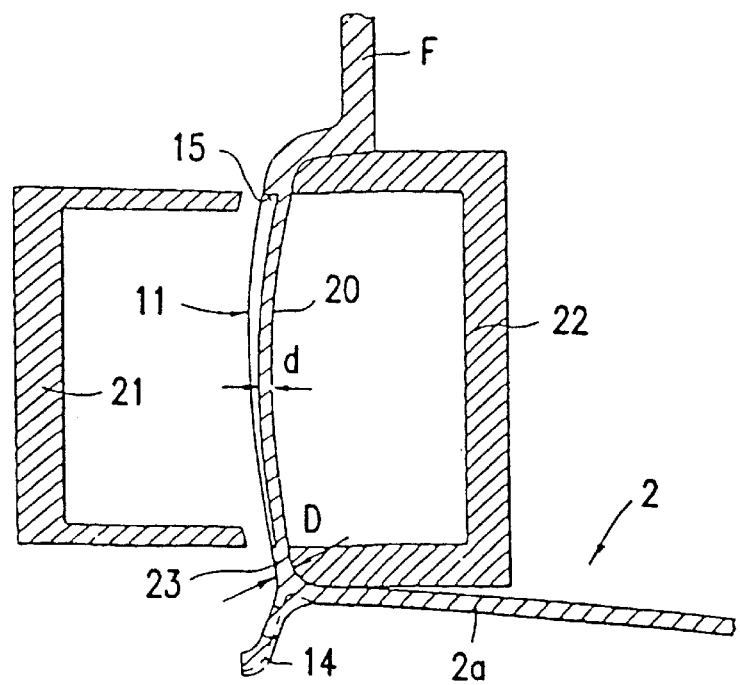
FIG. 2 is an enlarged view of the shell part of the rim of FIG. 1 that forms a part of the wheel, shown with a cast web and punch arranged in accordance with preferred embodiments of the invention.
Figure 3:
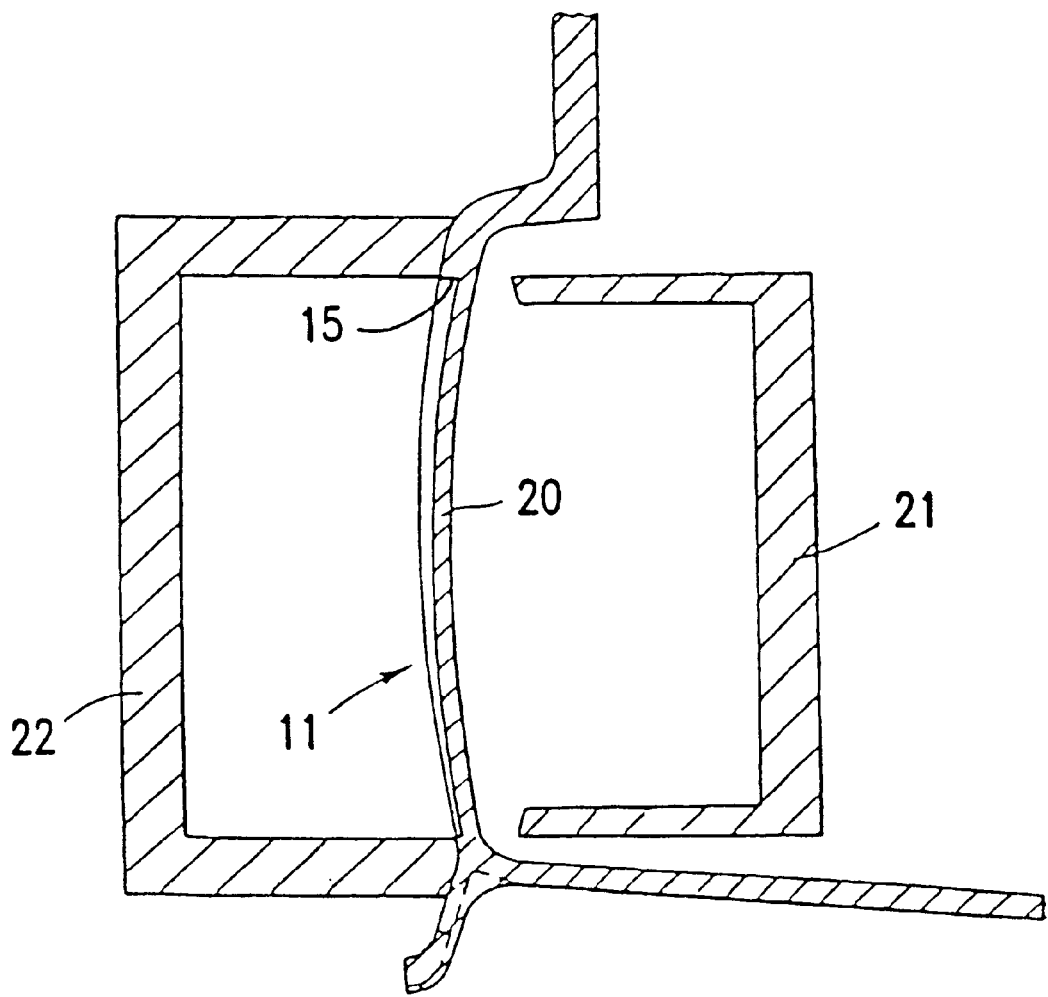
FIG. 3 is a view similar to FIG. 2, depicting a modified embodiment of the invention with a punch located on the inside of the wheel.

FIG. 2 depicts the manufacturing process and shows a portion of wheel 1 in the vicinity of an air opening 11 in shell part 2 of rim F. Air opening 11 is closed by a cast web 20. This web 20 is produced when rim F is cast. It is removed by means of a punching process or milling process or a laser cutting process. A tool is used for punching that consists of a punch 21 with a pressure pad 22. The tool can be designed so that all five air openings 11 in rim F can be punched out in one workstep. Punch 21 can be located inside or outside. When punch 21 is located inside, a larger air opening can be punched out, as shown in greater detail in FIG. 3.

Web 20 has a thickness d smaller than thickness D of adjoining wall 23 of rim F, and lies flush with at least one outer or inner surface of rim wall 23. In addition, the thickness d of web 20 is uniform throughout.

As shown in greater detail in FIG. 2, cast web 20 lies flush with the inside surface of rim wall 23 and is depressed relative to the outer surface of wall 23.

Figure 2A:
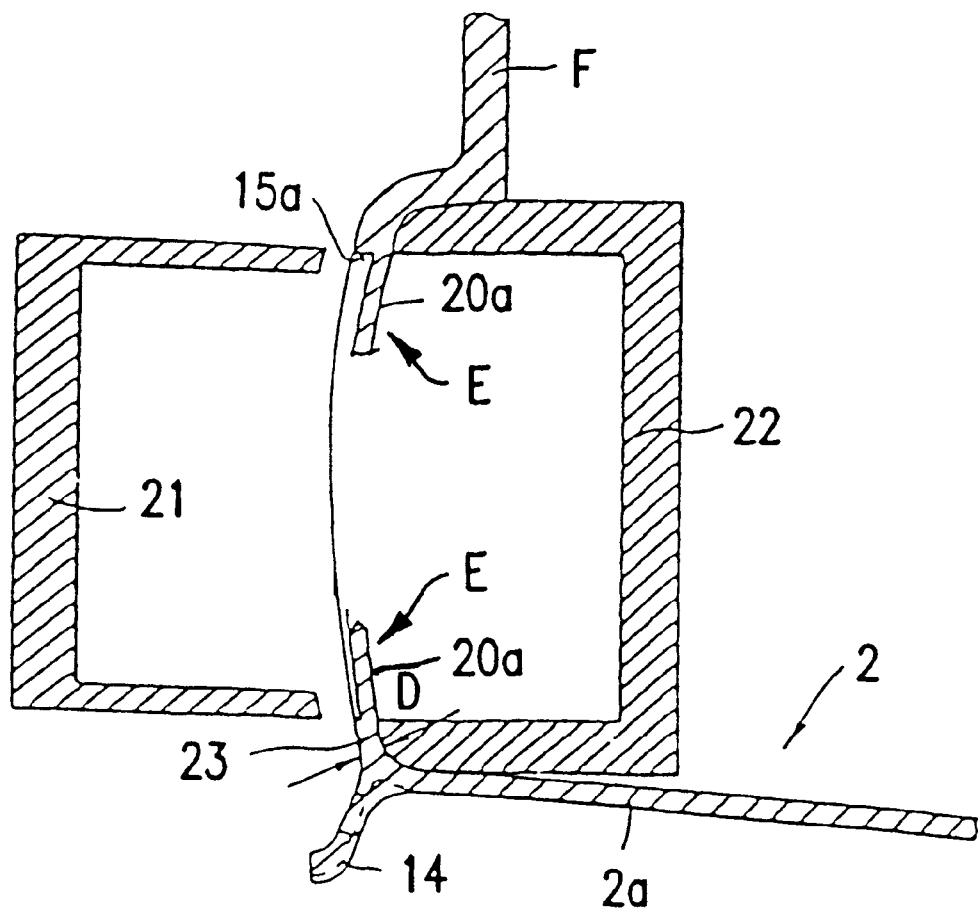
FIG. 2A is a view similar to FIG. 2, depicting an alternative embodiment where the cast webs only partially cover the intended air openings.

FIG. 2A schematically depicts an alternative embodiment where cast web 20A consists of only one edge E with an unspecified central area of air opening 15A being formed freely from web 20A. It is merely important in these embodiments that opening edge 15A be cut out by punch 21 and have a metallically clean circumferential edge.

As shown in greater detail in FIG. 1, wall 10 of air opening 5 of shell part 3 is inserted into air opening 11 of shell part 2 for connection, to link the two shell parts 2, 3. Precise punching of this air opening 11 allows wall 10 to be inserted with a precise fit and allows welding to be performed without any significant gaps. According to other contemplated embodiments, bonding is provided by other than welding, such as gluing.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A partial wheel assembly comprising a wheel disc part, said wheel disc part adapted to be connected with a wheel spider part to form a hollow spoked wheel having air openings extending parallel to a wheel center axis, said wheel disc part including air opening covering walls covering areas of intended air openings and having a wall thickness which is thinner than surrounding wheel disc part wall sections, thereby facilitating removal of the air opening covering walls with precise dimensioning of air openings to accommodate a mating fit with the wheel spider part having aligned air openings.

2. A wheel assembly according to claim 1, wherein said wheel disc part is a cast part, said air opening covering walls being formed as cast web walls.

3. A wheel assembly according to claim 2, wherein the cast web walls extend flush with at least one adjoining surface of the surrounding wheel disc part sections.

4. A wheel assembly according to claim 3, wherein the cast web walls have a constant thickness and extend flush with an adjoining surface of the surrounding wheel disc part wall sections at a side of said wall sections facing away from the wheel spider part when in an assembled condition.

5. A wheel disc assembly according to claim 2, wherein said cast web walls are configured to be removed by punching.

6. A wheel assembly according to claim 2, wherein said cast web walls are configured to be removed by numerically controlled milling.

7. A wheel assembly according to claim 2, wherein said cast web walls are configured to be removed by laser cutting.

8. A wheel assembly according to claim 2, wherein said cast web walls extend over only edge portions of the respective air openings.

* * * * *